(12) United States Patent
Yu et al.

(10) Patent No.: US 8,041,839 B2
(45) Date of Patent: Oct. 18, 2011

(54) METHOD AND SYSTEM OF PROVIDING ACTIVE WEB USER INTERFACE

(75) Inventors: Teng-Sheng Yu, Taipei Hsien (TW);
Peng-Zheng Yang, Taipei Hsien (TW);
Chih-Ting Mao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 115 days.

(21) Appl. No.: 12/511,265

(22) Filed: Jul. 29, 2009

(65) Prior Publication Data

US 2010/0257231 A1 Oct. 7, 2010

(30) Foreign Application Priority Data

Apr. 3, 2009 (CN) .......................... 2009 1 0301347

(51) Int. Cl.
*G06F 15/16* (2006.01)
(52) U.S. Cl. .......................... 709/246; 709/206; 709/217
(58) Field of Classification Search .................. 709/217, 709/206, 230, 246
See application file for complete search history.

(56) References Cited

U.S. PATENT DOCUMENTS

| 7,025,255 | B1* | 4/2006 | Drummond et al. | 235/379 |
| 7,603,657 | B2* | 10/2009 | Gassner et al. | 717/113 |
| 2008/0147671 | A1* | 6/2008 | Simon et al. | 707/10 |
| 2009/0055749 | A1* | 2/2009 | Chatterjee et al. | 715/738 |
| 2010/0162126 | A1* | 6/2010 | Donaldson et al. | 715/738 |
| 2010/0192220 | A1* | 7/2010 | Heizmann et al. | 726/19 |
| 2010/0229107 | A1* | 9/2010 | Turner et al. | 715/757 |

* cited by examiner

*Primary Examiner* — Douglas Blair
(74) *Attorney, Agent, or Firm* — Altis Law Group, Inc.

(57) ABSTRACT

A method of providing active web user interface is disclosed. The method includes questioning a web server about a message from an application program module by Asynchronous JavaScript and XML (AJAX). The web server asks the application program module to confirm receipt of the message. The web server obtains a result from the application program module, and returns to the web user interface control module. The web user interface receives the message from the web server and calls a plug-in module to provide a service about the message. The plug-in module starts the service of the application program module.

11 Claims, 2 Drawing Sheets

METHOD AND SYSTEM OF PROVIDING ACTIVE WEB USER INTERFACE

BACKGROUND

1. Technical Field

The present disclosure relates to a method and a system of providing an active web user interface and, particularly, to a method and a system of providing an active web user interface in an embedded system.

2. Description of Related Art

Web user interfaces are used in embedded systems. The web user interface is laid on a web browser which is by far the most common host environment for JavaScript. But the web user interface cannot directly communicate with an application program in the embedded system. A plug-in is proposed to solve the problem. The plug-in consists of a computer program that interacts with a host application (a web browser or an email client, for example) to provide a certain, usually very specific, function "on demand". Thus, the web user interface communicates with the application program through the plug-in. However, when the plug-in communicates with the application program, the web user interface cannot work due to the web user interface requiring synchronous communication with the plug-in. The web user interface cannot work until the plug-in ends communicating with the application program.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
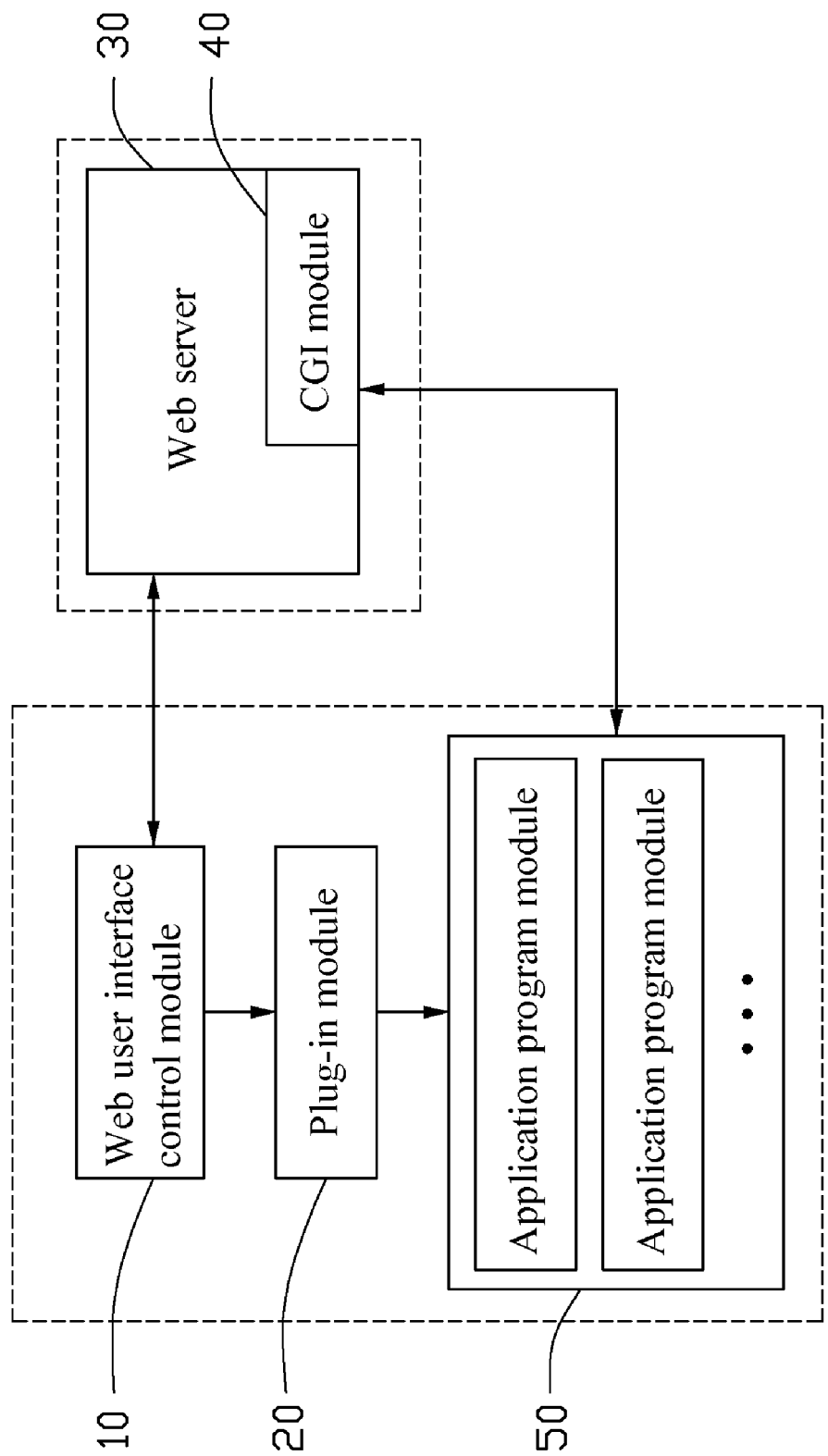
FIG. 1 is a block view of a system of providing active web user interface.

Referring to FIG. 1, a system may be used for providing an active web user interface. The system includes a web user interface control module 10, a plug-in module 20, a web server 30, a Common Gateway Interface module (CGI) 40 and a plurality of application program modules 50. The web user interface control module 10 may be used to control operations of a user interface of an embedded electronic device. The embedded electronic device may include a computing device, such as a desktop computer, a notebook computer, a mobile phone, or a handheld computer, for example. The web user interface control module 10 accepts input and provides output by generating web pages which are transmitted via the Internet and viewable by the user using a web browser program. The plug-in module 20 consists of a computer program that interacts with a host application (a web browser or an email client, for example) to provide a certain, usually very specific, function "on demand".

The web server 30 is responsible for accepting HTTP requests from clients (user agents such as web browsers), and serving them HTTP responses along with optional data content, which usually are web pages such as HTML documents and linked objects (images, etc.). The CGI module 40 is a standard protocol for interfacing external application software with an information server, commonly a web server. The CGI module 40 is stored in the web server 30. The application program module 50 is located in the embedded system.

The web user interface control module 10 is capable of inquiring of the web server 30 about a message from the application program module 50 by Asynchronous JavaScript and XML (AJAX). AJAX is a group of interrelated web development techniques used on the client-side to create interactive web applications or rich Internet applications. With Ajax, web applications can retrieve data from the server asynchronously in the background without interfering with the display and behavior of the existing page. The web server 30 asks the application program module 50 to confirm the message via the CGI module 40. The web server 30 obtains a result from the external application program module 50, and returns the result to the web user interface control module 10. The plug-in module 20 provides a service about the message through starting the application program module 50 about the message after the web user interface control module 10 receives the message from the web server 30.

Figure 2:
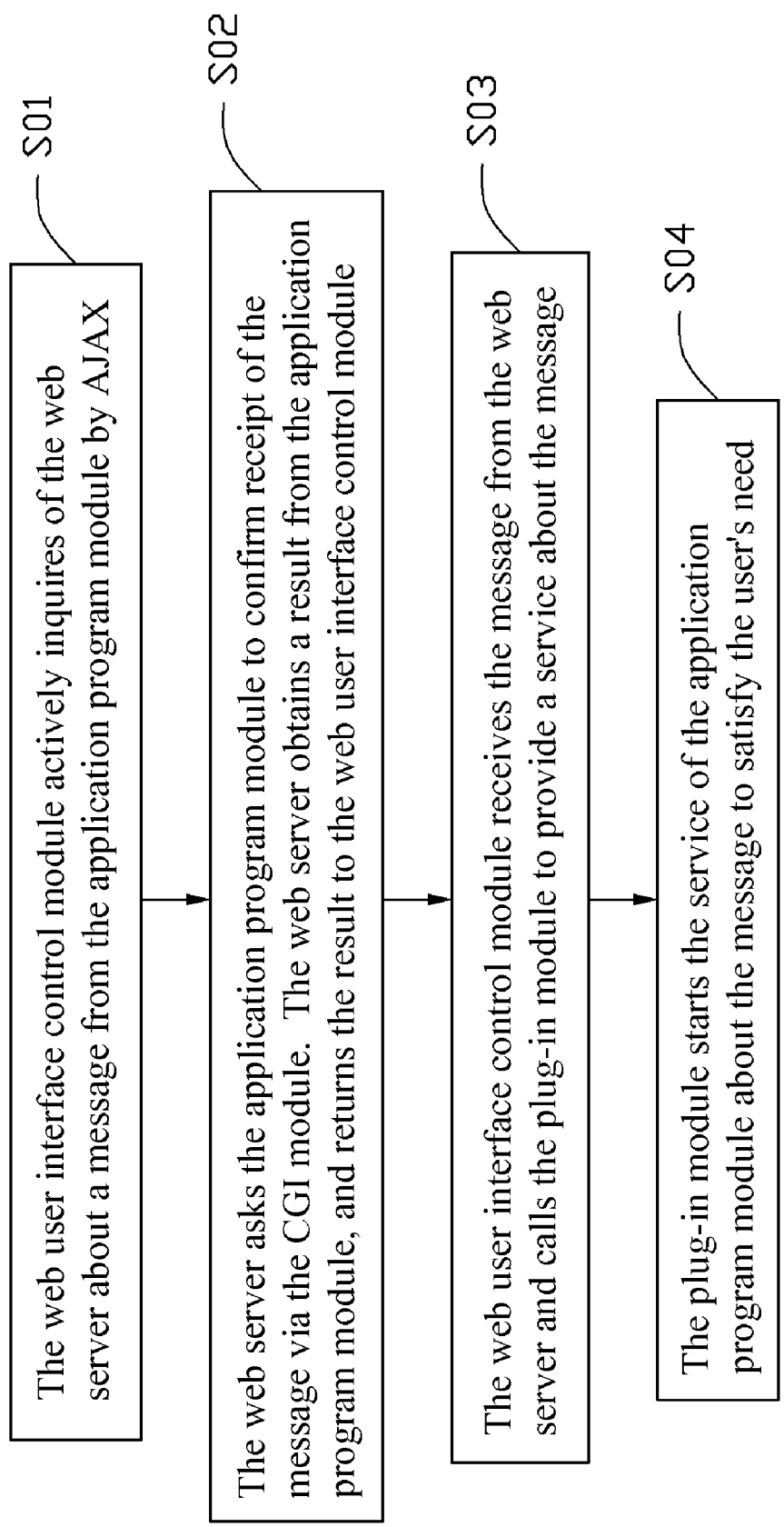
FIG. 2 is a flow chart of a method of providing active web user interface.

Referring to FIG. 2, a method of providing an active web user interface includes the following steps:

S01: the web user interface control module 10 actively questions the web server 30 for a message from the application program module 50 through Asynchronous JavaScript and XML (AJAX). The message may be a new mail message.

S02: the web server 30 asks the application program module 50 to confirm receipt of the message via the CGI module 40. The web server 30 obtains a result from the application program module 50, and returns the result to the web user interface control module 10. The web user interface control module 10 normally works when the web server 30 returns the result to the web user interface control module 10 by AJAX.

S03: the web user interface control module 10 receives the message from the web server 30 and calls the plug-in module 20 to provide a service about the message.

S04: the plug-in module 20 starts the service of the application program module 50 about the message to satisfy the user's need, for example, opening the new mail.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

It is also to be understood that the above description and the claims drawn to a method may include some indication in reference to certain steps. However, the indication used is only to be viewed for identification purposes and not as a suggestion as to an order for the steps.

What is claimed is:

1. A method of providing active web user interface, comprising:
   a web user interface control module questioning a web server about a message from an application program module of an electronic device through Asynchronous JavaScript and XML (AJAX);
   at the web server, confirming receipt of the message, obtaining a result from the application program module, and returning the result to a web user interface control module;
   the web user interface control module receiving the result from the web server and calling a plug-in module to provide a service about the message;
   starting the service of the application program module via the plug-in module.

2. The method of claim 1, wherein the confirming receipt of the message is competed through a common gateway interface (CGI) module.

3. The method of claim 2, wherein the CGI module is stored in the web server.

4. The method of claim 1, wherein the message is a new mail message.

5. The method of claim 1, wherein the web user interface control module is provided in an embedded system.

6. A system of providing active web user interface, comprising:
   a web server;
   an application program hardware module;
   a web user interface control hardware module capable of questioning the web server about a message from the application program hardware module by Asynchronous JavaScript and XML (AJAX), wherein the web server is capable of asking the application program hardware module to confirm receipt of the message, obtaining a result from the application program hardware module, and returning, the result to the web user interface control hardware module;
   a plug-in hardware module capable of providing a service about the message controlled by the web user interface control hardware module through starting the application program hardware module about the message after the web user interface control hardware module receives the message from the web server.

7. The system of claim 6, wherein the web server asks the application program hardware module through a common gateway interface (CGI) module.

8. The system of claim 7, wherein the CGI module is stored in the web server.

9. The system of claim 6, wherein the message is a new mail message.

10. The system of claim 6, wherein the web user interface control hardware module is provided in an embedded system.

11. A non-transitory computer-readable storage medium comprising executable computer program instructions that when executed cause a computing system to perform the method of claim 1.

* * * * *